Patented Dec. 5, 1944

2,364,563

UNITED STATES PATENT OFFICE 2,364,563

KERATITIC MEDICAMENT

John B. Stribling, Rotan, Tex.

No Drawing. Application September 25, 1941,
Serial No. 412,283

4 Claims. (Cl. 167—53.2)

This invention relates to a medicament peculiarly effective for the relief and curing of keratitis, commonly called "pink eye."

This disease in its usual form occurs most frequently in the summer time and an animal (chiefly cattle and sheep) when once infected, can transmit the disease to other animals in the herd or flock. The prevalence in the summer time is thought to be due to irritation of the eye by pollen, et cetera, from the vegetation upon which the animals feed.

The clinical data so far available as a result of personal use, and by the Departments of Physiology and Pharmacology of Baylor University, as well as others to which the medicament recently has been supplied, indicates that the main active ingredient Sulfathiazole Sodium Sesquihydrate and other water soluble sulfonamides are safe to use and effective for the relief and cure of keratitis in animals.

Since it cannot be said to be due to the pollen of a single plant, et cetera, this is of necessity a mixed infection, and since in comparatively open range country, such as to the Southwest, the animals may not be subject to daily inspection, it is apparent that the infection may be in various stages when discovered.

Accordingly, some cattle treated have been blind, others treated have had their eyes extremely ulcerated and still others have had the usual symptoms of irritation and discharges.

So far as now known, every case treated with this medicament has been cured.

Various variations of the medicament have been tested. These variations are as to physical form as well as constituents. Common or trade names are usually employed hereinafter, despite the fact the true chemical term of each also is given.

By way of example only, and not in any sense as a limitation, it has been found that the powder form appears easiest to handle, and that material containing about equal parts of the aforesaid active ingredient and charcoal and to the extent of about 80 to 95 percent of the total material has been most effective.

One example contained 20 grams of Sulfathiazole Sodium Sesquihydrate (sodium 2-sulfanilyl aminothiazole sesquihydrate) (Merck & Co. Inc. or E. R. Squibb & Sons), 1 gram of Sulfanilamide, 1 gram of Sulfathiazole (2-sulfanilyl aminothiazole) (Lederle Laboratories, Inc.), 1 gram of Peoprontosil and 20 grams of "Willow" charcoal, all solids being in fine powder form. The Neoprontosil is disodium 4-sulfamido-phenyl-2- azo-7-acetylamino-1-hydroxynaphthalene 3,6 disulfonate (Winthrop Chemical Company, Inc.) and broadly is a brand of Azosulfamide.

Another example contained Aspirin (acetyl salicyclic acid) 0.5%, Calomel 0.5%, Sulfanilamide 2%, Sulfathiazole 2%, Neoprontosil 5%, "Willow" charcoal 50% and Sulfathiazole Sodium Sesquehydrate 40%.

Since plain Sulfanilamide, Sulfathiazole, and other sulfonamides which are not to any considerable degree soluble in water, used alone have given little indication of curative properties relative to keratitis and these products are known to be insoluble or difficulty soluble in water, it might be said that the remarkable effects of Sulfathiazole Sodium Sesquihydrate and other water soluble sulfonamides are due to their family relationship therapeutic value as well as their water solubility which of Sulfathiazole Sodium Sesquihydrate, is 45 grams of hydrated material being soluble in 100 cc. at room temperature. This appears to be confirmed by the fact that soluble Sulfathiazole Sodium Monohydrate also is highly effective, 54 grams being soluble in 100 cc. at room temperature, and Neoprontosil, another water soluble sulfonamide has some curative effect.

In these examples, it is known that the Sulfathiazole Sodium Sesquihydrate and other water soluble sulfonamides are the major therapeutic agent. The charcoal collects on the eyelid and serves the purpose of keeping light from being reflected directly into the eye of the animal. The designation "Willow" is a mere statement of preference as ordinary powdered charcoal has served quite as well.

The Neoprontosil colors the liquid in the eye, further alleviating eye strain during the treatment.

"Aspirin," when used, appears to have a slight pain deadening action.

It is not known what effect, when used, the Calomel (mild mercurous chloride) has but it is supposed in the presence of the other ingredients and tears, to break down and have some antiseptic property. The sulfa-compounds are known to have some curative or therapeutic effect and in this connection the Sesquehydrate and other water soluble sulfonamides, as stated, appear to be most effective, in fact in certain instances, the Sesquihydrate has been used alone, and found effective whereas the non-soluble similar compounds were comparatively ineffective.

However, when used alone, the reaction is such that this material per se irritates the eye and produces a secondary reaction, that is, the running condition persists, although in diminished amount, as the infection subsides.

One theory is, and the same is advanced by way of explanation only, that water soluble sulfonamides, such as the Sulfathiazole Sodium Sesquihydrate only or alone, irritate the eyes to such an extent that watering frequently continues for as long as forty-eight hours after treatment even though the primary infection has been cured. Experience indicates that when the purulent character of the eye discharge is no longer present, the infection is cured and no further treatment is required even though watering persists. This ceases in a day or so for by then the irritating property of the Sulfathiazole Sodium Sesquihydrate used has been exhausted.

Accordingly, since irritation should be reduced as much as possible to expedite cure, the combination of the Sulfathiazole Sodium Sesquihydrate and powdered "Willow" charcoal is preferred to the use of the former alone.

For reasons assigned hereinbefore, the last example disclosed is preferred over the others.

However, it is to be understood the present invention comprehends all examples and such obvious extensions and variations thereof as would normally occur to persons skilled in this art, bearing in mind the distinctions hereinbefore set forth.

One test upon nine animals was as follows: Two of these were blind and one, a calf, had a keratitis lesion. The former after four treatments could see and were markedly improved so far as the infection was concerned. In the calf, after four treatments, the lesion had almost disappeared. The other six animals were treated as follows: All right eyes (infected) were treated with the 43 gram mixture recited and all left eyes treated with only Sulfathiazole Sodium Sesquihydrate. After three treatments, one each day, all right eyes were practically normal and the left eyes were watering a little. The mixture was then used in the left eyes and all cleared up. This demonstrated the effectiveness of the active ingredient as well as the preferability of the mixture over the sulfonamide ingredient per se.

Another reason the mixture is preferred is because the active ingredient, Sulfathiazole Sodium Sesquihydrate (obtained from E. R. Sqibb & Sons and/or Merck & Company, Inc.), tends to be deliquescent and cakes in the bottle.

In applying the powder to the eye, it has been ascertained that an ordinary drinking straw, about 1/8" in diameter, is pushed into the powder to a depth to fill the straw from 1/8" to 1/4". This approximate amount then is blown into each affected eye.

This is repeated daily or on alternate days. One or two treatments have been found sufficient to cure ordinary cases. In advanced cases, clouded, blinded or ulcerated eyes, the treatment is continued as required. As stated, to date there have been no known failures.

The use of the straw, it has been found, is an economical instrument, that is sufficiently sanitary as commercially available, so that secondary contamination therefrom does not occur. Also, the extremely low unit cost of the straws is such that one can be used for each eye, or animal as desired, and then discarded.

In one instance of fifty-two keratitic afflicted animals, the percentage described mixture was used. The dosage was about 1/4" per straw per eye. In these animals after twenty-four hours, twenty-one showed no such infection and the remaining thirty-one showed definite improvement. These latter were similarly treated the second day. On the third day all but seven showed no signs of infection, and these seven showed marked improvement. These seven originally had eyes which were clouded and blind when treatment was started. At the end of the third day, five of these seven were free from all signs of infection. The two remaining were similarly treated on the fourth day. These two originally had ulcerated eyes. These two were treated daily for seven days and on the eighth day, they showed no signs of infection.

Since these fifty-two animals were treated as described, another group of twelve was discovered and these were treated with various solutions of the essential ingredient (the Sulfathiazole Sodium Sesquihydrate and other water soluble sulfonamides including Neoprontosil and Sulfathiazole Sodium Monohydrate), both alone and in combination with other drugs, with an oil base and a vegetable base ointment, and in powder form combined with a number of other substances, some of which were both inert and insoluble in water, others of which were active and some of which were soluble in water.

These various solutions, dilutions, mixtures, et cetera, proved effective in varying degrees.

Best results have been obtained with preparations including powdered "Willow" charcoal, Sulfathiazole Sodium Sesquihydrate and Neoprontosil.

It also has been determined that sulfonamides, other than those specified, and which are insoluble in water, are not effective to any considerable degree in the treatment of keratitis.

The Sulfathiazole Sodium Sesquihydrate being readily water soluble, accordingly has been found the most effective of all sulfonamides tested.

It also has been determined that the ointment type application is not as effective as the powder application.

It has been generally recognized by the manufacturers of water soluble sulfonamides, such as the mono and sesquihydrates, that they are intended exclusively for intravenous injection in emergencies only and when the patient is extremely ill from pneumococci, staphylococci and/or streptococci such that retention is impossible or effect desired, will be delayed too long.

These two drugs have been released for hospital use only and should be used then only under the constant supervision of a physician because neither should be injected subcutaneously, intramuscularily or intraspinally, and only two intravenous injections are permitted and these cannot be closer than four to six hours apart, depending on various factors. Careless injection, therefore, may be extremely dangerous.

Both of these drugs also have a local injurious effect in humans, particularly on the tissues when they come in contact therewith and these toxic reactions appear to be limited to those commonly experienced with sulfathiazole itself.

So far as known, this is the first use of a water soluble sulfonamide directly applied to an eye for the relief and cure of an eye infection.

It also has been determined that because of the temporary retention of the liquid in the eye, the liquid application is less effective than the powder type for in the latter the eye, et cetera, tissues make the liquid as required.

While the invention has been described in great detail in the foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A keratitic medicament composition comprising a water soluble sodium sulphathiazole, a water soluble azosulfamide indicator, and a powdered charcoal diluent.

2. A composition as defined by claim 1 wherein the water soluble sodium sulphathiazole is sulfathiazole sodium sesquihydrate and the indicator is disodium 4 - sulfamido - phenyl - 2-azo-7-acetyl-amino-1-hydroxynaphthalene 3,6 disulfonate.

3. A composition as defined by claim 1 wherein the indicator is present in minor amount and the other ingredients comprise not less than eighty percent of the composition.

4. A keratitic medicament composition comprising a powdered water soluble sodium sulphathiazole present in an amount at least equal to approximately forty percent of the composition, and a powdered charcoal diluent in appreciable amount.

JOHN B. STRIBLING.